United States Patent
Deselaers et al.

(10) Patent No.: US 10,402,734 B2
(45) Date of Patent: Sep. 3, 2019

(54) TEMPORAL BASED WORD SEGMENTATION

(71) Applicant: Google Inc., Mountain View, CA (US)

(72) Inventors: Thomas Deselaers, Zurich (CH); Daniel Martin Keysers, Stallikon (CH); Abraham Murray, Scituate, MA (US); Shumin Zhai, Los Altos, CA (US)

(73) Assignee: Google LLC, Mountain View, CA (US)

( * ) Notice: Subject to any disclaimer, the term of this patent is extended or adjusted under 35 U.S.C. 154(b) by 1018 days.

(21) Appl. No.: 14/836,113

(22) Filed: Aug. 26, 2015

(65) Prior Publication Data

US 2017/0061291 A1 Mar. 2, 2017

(51) Int. Cl.
*G06K 9/00* (2006.01)
*G06N 5/04* (2006.01)
*G06F 3/0488* (2013.01)
*G06F 3/023* (2006.01)

(52) U.S. Cl.
CPC ............ *G06N 5/04* (2013.01); *G06F 3/0237* (2013.01); *G06F 3/04883* (2013.01); *G06F 3/04886* (2013.01); *G06K 9/00402* (2013.01)

(58) Field of Classification Search
CPC ................................. G06N 5/04; G06F 3/0237
See application file for complete search history.

(56) References Cited

U.S. PATENT DOCUMENTS

| | | | |
|---|---|---|---|
| 6,340,967 B1 | 1/2002 | Maxted | |
| 7,305,630 B2 * | 12/2007 | Hullender | ........... G06F 3/04883 345/173 |
| 7,409,090 B2 | 8/2008 | Akiyama | |
| 8,701,032 B1 | 4/2014 | Zhai et al. | |

(Continued)

FOREIGN PATENT DOCUMENTS

| | | |
|---|---|---|
| CN | 101382844 A | 3/2009 |
| EP | 2703955 A1 | 3/2014 |
| WO | 2007068505 A1 | 6/2007 |

OTHER PUBLICATIONS

International Search Report and Written Opinion of International Application No. PCT/US2016/045713, dated Nov. 9, 2016, 12 pp.

(Continued)

*Primary Examiner* — Scott A. Waldron
*Assistant Examiner* — Kevin W Figueroa
(74) *Attorney, Agent, or Firm* — Shumaker & Sieffert, P.A.

(57) ABSTRACT

A computing device is described that receives first input, at an initial time, of a first textual character and a second input, at a subsequent time, of a second textual character. The computing device determines, based on the first and second textual characters, a first character sequence that does not include a space character between the first and second textual characters and a second character sequence that includes the space character between the first and second textual characters. The computing device determines a first score associated with the first character sequence and a (Continued)

second score associated with the second character sequence. The computing device adjusts, based on a duration of time between the initial and subsequent times, the second score to determine a third score, and responsive to determining that the third score exceeds the first score, the computing device outputs the second character sequence.

20 Claims, 4 Drawing Sheets

(56) References Cited

U.S. PATENT DOCUMENTS

| | | | | |
|---|---|---|---|---|
| 2012/0114245 | A1* | 5/2012 | Lakshmanan | G06K 9/00409 382/186 |
| 2012/0167009 | A1 | 6/2012 | Davidson et al. | |
| 2013/0034303 | A1 | 2/2013 | Morwing et al. | |
| 2013/0162553 | A1 | 6/2013 | Rowley et al. | |
| 2014/0214405 | A1 | 7/2014 | Ouyang et al. | |
| 2015/0356360 | A1* | 12/2015 | Wimmer | G06K 9/00402 382/189 |

OTHER PUBLICATIONS

International Preliminary Report on Patentability from International Application No. PCT/US2016/045713, dated Mar. 8, 2018, 8 pp.
Yanming Zou et al., "Overlapped Handwriting Input on Mobile Phones," Proceedings of the 2011 International Conference on Document Analysis and Recognition, Sep. 18-21, 2011, pp. 369-373.
Charles C. Tapped et al., "The State of the Art in On-Line Handwriting Recognition," IEEE Transactions on Pattern Analysis and Machine Intelligence, vol. 12, No. 8, Aug. 1990, 23 pp.
Jayashree Subrahmonia et al., "Pen Computing: Challenges and Applications," Proceedings of the 15th International Conference on Pattern Recognition, vol. 2, Sep. 3-8, 2000, pp. 60-66.
Lars Winkler Pettersson, "Handwritten Messaging Techniques for presenting handwritten messages on mobile devices with small displays," Departments of Information Technology, Uppsala University, Jun. 2003 57 pp.
H. Bunke et al., "Recovery of temporal information of cursively handwritten words for on-line recognition," Proceedings of the Fourth International Conference on Document Analysis and Recognition, Aug. 18-20, 1997, pp. 931-935.
Stefan Manke et al., "A Fast Search Technique for Large Vocabulary On-Line Handwriting Recognition," International Workshops on Frontiers in Handwriting Recognition, University of Essex, Sep. 2-5, 1996, 6 pp.
Yi Sun et al., "Identifying Word Boundaries in Handwritten Text," Proceedings of the International Conference on Machine Learning and Applications, 2004, pp. 5-9.
Franz Josef Och et al., "Minimum Error Rate Training in Statistical Machine Translation," Proceedings of the 41st Annual Meeting on Association for Computational Linguistics, Jul. 7-12, 2003, pp. 160-167.
Charles C. Tappert et al., "Recent Advances in Pen Computing," School of Computer Science and Information Systems, No. 166, Aug. 2001, 14 pp.
Response to communication under Rules 161(1) and 162 EPC from counterpart EP Application No. 16756848.4, filed May 11, 2018, 3 pp.
Examination Report from counterpart European Application No. 16756848.4, dated Sep. 19, 2018, 8 pp.
Response to Examination Report dated Sep. 19, 2018, from counterpart European Application No. 16756848.4, filed Jan. 11, 2019, 9 pp.
Communication pursuant to Article 94(3) EPC from counterpart European Application No. 16756848.4, dated Apr. 2, 2019, 5 pp.

* cited by examiner

TEMPORAL BASED WORD SEGMENTATION

BACKGROUND

Some computing devices (e.g., mobile phones, tablet computers, etc.) may provide a graphical keyboard or handwriting input feature as part of a graphical user interface for composing text using a presence-sensitive input device such as a track pad or a touch screen. Such computing devices may rely on auto-completion and character recognition systems to correct spelling and grammar errors, perform word segmentations (e.g., by inserting spaces characters to separate text input into multiple words), and perform other character and word recognition techniques for assisting a user in inputting typed or handwritten text. However, some auto-completion systems may be limited in capability and may make corrections that are inconsistent with the user's intended text. Consequently, a user may need to exert additional effort to remove, delete, or otherwise correct an erroneous correction.

DETAILED DESCRIPTION

In general, this disclosure is directed to techniques for segmenting text input into one or more words by applying a language model and/or a spatial model to the text input in combination with temporal characteristics of the text input. For example, a computing device may provide a graphical keyboard or handwriting input feature as part of a graphical user interface from which a user can provide text input (e.g., a sequence of textual characters) using a presence-sensitive input component of the computing device, such as a track pad or a touch screen. As feedback that the computing device is accurately interpreting the text input, the computing device may present a graphical output that is generated based on the text input. Rather than present the exact sequence of textual characters that the device derives from the text input, the computing device analyzes the sequence of textual characters to determine word boundaries and spelling or grammatical errors, which the computing device uses to automatically insert spaces and correct the errors before presenting the graphical output at the screen.

The computing device utilizes a language model and/or a spatial model to determine, with a degree of certainty or "total score" (e.g., a probability derived from a language model score and/or a spatial model score), whether portions of the text input are intended to represent one or more individual letters, combinations of letters, or words of a lexicon (e.g., a dictionary). If the language model and/or spatial model indicates that a portion of text input is more likely a misspelling of one or more letters, combinations of letters, or words in the lexicon, the computing device may replace the misspelled portions of the received text input with the one or more corrected letters, combinations of letters, or words from the lexicon. The computing device may insert spaces into the text input at each of the word boundaries identified by the language model and/or spatial model to clearly segment the graphical output of the text input into one or more clearly identifiable words.

To improve the accuracy of the language model and/or spatial model as well as to better perform word segmentation, the computing device also uses temporal characteristics of the text input to determine whether certain portions of the text input represent word breaks or spaces between words that are not necessarily the highest ranking words in the lexicon. In other words, the computing device uses the language model and/or the spatial model in combination with temporal characteristics of the input to determine whether the user intended to enter a word break or a "space" in text input, even if the word break or space is less likely to appear in a particular language context.

For example, the computing device may infer that short delays or pauses in receiving text input of two successive characters is an indication of a user intent to not designate a space or word boundary in the text input and that longer delays in receiving text input of two successive characters is an indication of a user intent to enter a space or word boundary in the text input. Accordingly, if the computing device detects a short delay in receiving successive character inputs, the computing device may disregard the short delay and treat the successive character inputs as forming part of a single word. However, if the computing device detects a long delay in receiving successive character inputs, the computing device may increase the total score of a pair of words that include a word break or space between the successive characters. The computing device may adjust the total score as a function of the duration of the delay, so as to increase a likelihood that the computing device will more correctly identify word breaks or spaces based on intentional pauses in text input.

Figure 1:
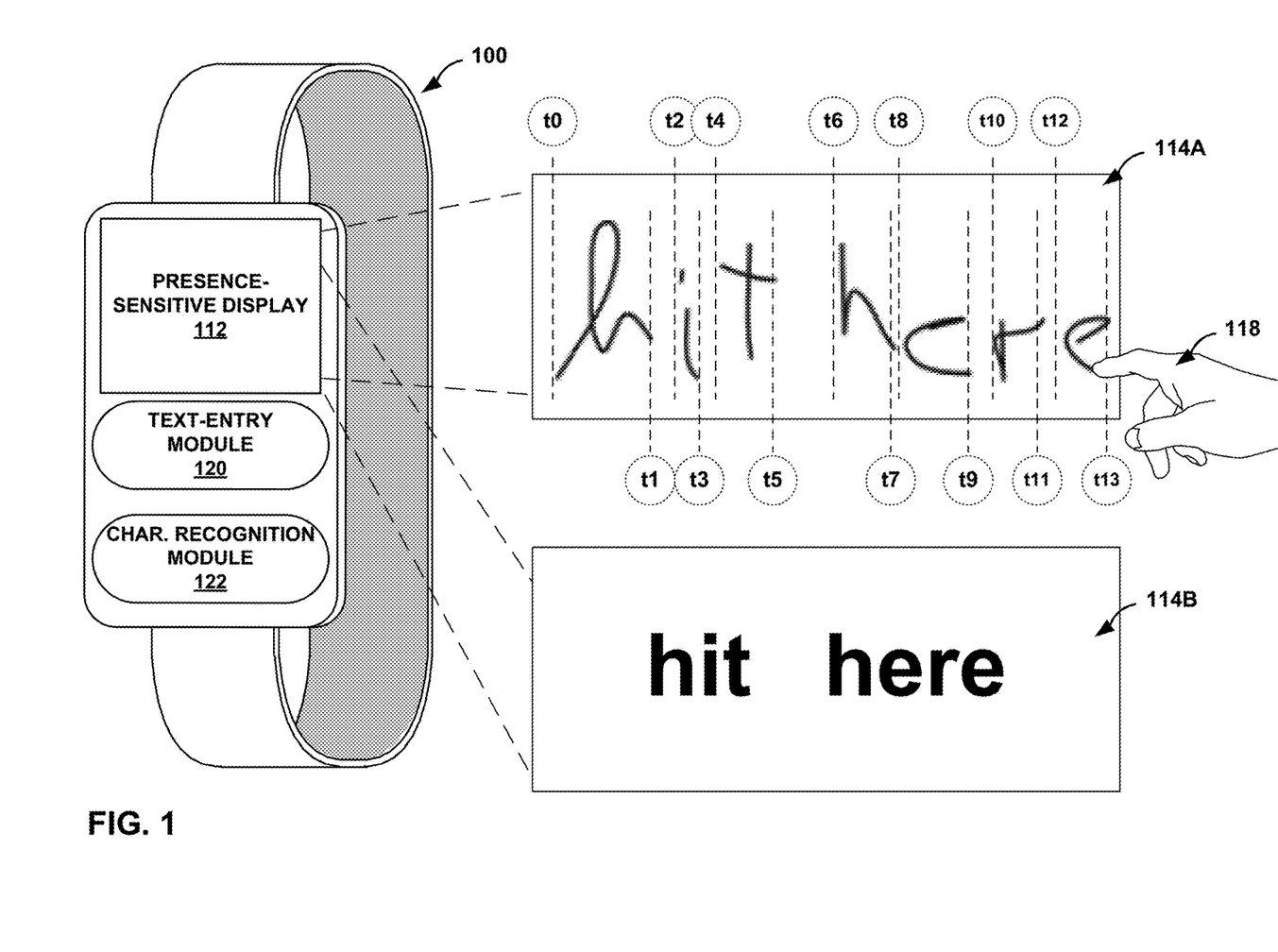
FIG. 1 is a conceptual diagram illustrating an example computing device that is configured to segment text input into two or more words, in accordance with one or more techniques of this disclosure.

FIG. 1 is a conceptual diagram illustrating computing device 100 as an example computing device that is configured to segment text input into two or more words, in accordance with one or more techniques of this disclosure. In the example of FIG. 1, computing device 100 is a wearable computing device (e.g., a computerized watch or so-called smart watch device). However, in other examples, computing device 100 may be a mobile phone, a tablet computer, a personal digital assistant (PDA), a laptop computer, a portable gaming device, a portable media player, an e-book reader, a television platform, an automobile computing platform or system, a fitness tracker, or any other type of mobile or non-mobile computing device that receives typed or handwritten textual input from a user.

Computing device 100 may include presence-sensitive display 112. Presence-sensitive display 112 of computing device 100 may function as an input component for computing device 100 and as an output component. Presence-sensitive display 112 may be implemented using various technologies. For instance, presence-sensitive display 112 may function as a presence-sensitive input component using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, a camera and display system, or another presence-sensitive screen technology. Presence-sensitive display 112 may function as an output component, such as a display device, using any one or more of a liquid crystal display (LCD), dot matrix display, light emitting diode (LED) display, organic light-emitting diode (OLED) display, e-ink, or similar monochrome or color display capable of outputting visible information to the user of computing device 100.

Presence-sensitive display 112 of computing device 100 may include a presence-sensitive screen that can receive tactile user input from a user of computing device 100 and present output. Presence-sensitive display 112 may receive indications of the tactile user input by detecting one or more tap and/or non-tap gestures from a user of computing device 100 (e.g., the user touching or pointing at one or more locations of presence-sensitive display 112 with a finger or a stylus pen) and in response to the input, computing device 100 may cause presence-sensitive display 112 to present output. Presence-sensitive display 112 may present the output as part of a graphical user interface (e.g., screen shots 114A and 114B) that may be related to functionality provided by computing device 100, such as receiving text input from a user. For example, presence-sensitive display 112 may present a graphical keyboard from which user 118 can provide keyboard based text input and/or a handwriting input feature from which user 118 can provide handwritten text input.

User 118 may interact with computing device 100 by providing one or more tap or non-tap gestures at or near presence-sensitive display 112 for entering text input. When user 118 inputs handwritten text input, as opposed to keyboard based text input, the handwritten text input may be in print, cursive, or any other form of writing or drawing. In the example of FIG. 1, user 118 writes (e.g., with a finger or stylus) a mixture of print and cursive letters h-i-t-h-e-r-e between times t0 and t13. FIG. 1 shows user 118 writing the letter h, beginning and ending respectively, at times t0 and t1, writing the letter i, beginning and ending respectively, at times t2 and t3, and writing the letter t, beginning and ending respectively, at times t4 and t5. After a pause between times t5 and t6, FIG. 1 shows user 118 again writing the letter h, beginning and ending respectively, at times t6 and t7, writing the letter e, beginning and ending respectively, at times t8 and t9, writing the letter r, beginning and ending respectively, at times t10 and t11, and again writing the letter e, beginning and ending respectively, at times t12 and t13.

Computing device 100 may include text-entry module 120 and character recognition module 122. Modules 120 and 122 may perform operations using software, hardware, firmware, or a mixture of hardware, software, and/or firmware residing in and executing on computing device 100. Computing device 100 may execute modules 120 and 122 with multiple processors and/or as a virtual machine executing on underlying hardware. In some examples, presence-sensitive display 112 and modules 120 and 122 may be arranged remotely to, and remotely accessible from, computing device 100, for instance, as one or more network services that is accessible via a network cloud.

Text-entry module 120 may manage the user interface that computing device 100 provides at presence-sensitive display 112 for handling textual input from a user. For example, text-entry module 120 may cause computing device 100 to present a graphical keyboard or a handwriting input feature as part of a graphical user interface (e.g., screen shot 114A) from which a user, such as user 118, can provide text input (e.g., a sequence of textual characters) using presence-sensitive display 112. As a form of feedback that computing device 100 is accurately receiving handwritten text input at presence-sensitive display 112, text-entry module 120 may cause computing device 100 to display a trace or "ink" corresponding to the locations of presence-sensitive display 112 at which the text input is received (e.g., screen shot 114A). As an additional or alternative form of feedback that computing device 100 is accurately interpreting text input received by presence-sensitive display 112, text-entry module 120 may cause computing device 100 to present the individual characters that computing device 100 infers from the text input as graphical output (e.g., screen shot 114B).

Text-entry module 120 may receive information from presence-sensitive display 112 about an indication of a user input detected at presence-sensitive display 112 as user 118 provides tap or non-tap gesture input at presence-sensitive display 112. Text-entry module 120 may determine a sequence of touch events based on the information received from presence-sensitive display 112. Each touch event in the sequence may include data about where, when, and from what direction at presence-sensitive display 112 that presence-sensitive display 112 detected user input. Text-entry module 120 may call on character recognition module 122 to process and interpret the textual characters associated with the text input by outputting the sequence of touch events to character recognition module 122. Responsive to outputting the sequence of touch events, text-entry module 120 may receive, from character recognition module 122, an indication of one or more textual characters or words separated by spaces, that character recognition module 122 derived from the touch events. Text-entry module 120 may cause presence-sensitive display 112 to present the textual characters received from character recognition module 122 as graphical output (e.g., screen shot 114B).

Character recognition module 122 may perform character-level and/or word-level recognition operations on a sequence of touch events that text-entry module 120 determines from text input provided at presence-sensitive display 112. Character recognition module 122 may perform character-level recognition of text input by determining a sequence of textual characters based on touch events received from text-entry module 120. In addition, character recognition module 122 may perform word-level recognition of text input to determine a sequence of words that include the individual characters determined from the touch events. For example, using a spatial model, character recognition module 122 may interpret a sequence of touch events as a selection of keys of a graphical keyboard presented at presence-sensitive display 112 and determine a sequence of individual characters that correspond to the selection of keys along with a spatial model score that indicates, with a degree of certainty, how likely the sequence of touch events represent the selection of a key. Alternatively, using stroke recognition techniques and a spatial model, character recognition module 122 may interpret a sequence of touch events as a sequence of strokes of handwritten text input and determine a sequence of individual characters that correspond to the sequence of strokes along with a spatial model score that indicates, with a degree of certainty, how likely the sequence of touch events represent the strokes of the individual letters. Character recognition module 122 may determine, based on the spatial model score, a total score that indicates, with a degree of certainty, how likely the sequence of touch events represent the text input.

Rather than simply output to text-entry module 120, a literal sequence of textual characters that character recognition module 122 derives from a sequence of touch events, character recognition module 122 may perform additional analysis on the sequence of touch events to identify potential word boundaries and spelling or grammatical errors associated with the text input. Character recognition module 122 may automatically insert spaces and correct potential errors in a sequence of characters that is derived from touch events before outputting the textual characters to text-entry module 120 for presentation at presence-sensitive display 112.

Character recognition module 122 may segment text input into one or more words using aspects of the spatial mode and/or a language model in addition to temporal characteristics of the text input. In operation, after receiving, at an initial time, a first input detected at presence-sensitive display 112 of at least one first textual character, computing device 100 may receive, at a subsequent time, a second input detected at presence-sensitive display 122 of at least one second textual character. For example, between the initial times t0 and t5, presence-sensitive display 112 may detect initial handwritten text input as user 118 gestures the letters h-i-t at or near locations of presence-sensitive display 112. Between subsequent times t6 and t13, presence-sensitive display 112 may detect subsequent handwritten text input as user 118 gestures the letters h-e-r-e at or near locations of presence-sensitive display 112. Presence-sensitive display 112 may output information to text-entry module 120 that indicates the locations (e.g., x,y coordinate locations) and times at which presence-sensitive display 112 detected the initial and subsequent handwritten text input.

Text-entry module 120 may assemble the locations and times from the information received from presence-sensitive display 112 into a time-ordered sequence of touch events. Text-entry module 120 may pass the sequence of touch events, or a pointer to a location in a memory of computing device 100 at which the sequence of touch events is stored, to character recognition module 122 for translation into a sequence of textual characters.

Using a spatial model and other stroke recognition techniques, character recognition module 122 may interpret the sequence of touch events received from text-entry module 120 as a sequence of written strokes that make up a sequence of individual characters. Character recognition module 122 may derive a total score based at least in part on the spatial model score the spatial model assigns to the sequence of individual characters.

For example, character recognition module 122 may characterize a portion of the touch events as defining different vertical strokes, horizontal strokes, curved strokes, diagonal strokes, arc-shaped strokes, etc. Character recognition module 122 may assign a score or ranking to potential characters that more closely resemble the strokes defined by the touch events and combine each individual score (e.g., a product sum, average, etc.) to determine a total score associated with the text input. The total score or ranking may indicate a degree of likelihood or a confidence level that one or more of the touch events corresponds to a stroke or combination of strokes associated with a particular textual character. Character recognition module 122 may produce a sequence of characters based at least in part on the total score or ranking, as well as other factors. For example, based on the touch events associated with times t0 through t13, character recognition module 122 may define a sequence of characters as h-i-t-h-e-r-e.

Rather than merely output the sequence of characters generated from the touch events, character recognition module 122 may perform additional character and word recognition operations to more accurately determine the textual characters that user 118 intended to input at presence-sensitive display 112. Character recognition module 122 may determine, based on the at least one first textual character and the at least on second textual character, a first character sequence that does not include a space character between the at least one first textual character and the at least one second textual character and a second character sequence that includes a space character between the at least one first textual character and the at least one second textual character.

For example, character recognition module 122 may input the sequence of characters h-i-t-h-e-r-e into a language model that compares the sequence of characters to various words and word combinations in a lexicon (e.g., a dictionary). The language model may assign a respective language model score or ranking to each word or word combinations in the lexicon that could potentially represent the text input that user 118 intended to input at presence-sensitive display 112 when the user provided the handwritten text input that character recognition module 122 recognizes as h-i-t-h-e-r-e. Using the respective language model score for each potential word or word combination, and the total score determined from the touch events, character recognition module 122 may determine a respective, "total" score for each potential word or word combination.

For example, the language model may identify the word combinations of "hi there" and "hit here" as possible representations of the sequence of textual characters. Since the phrase "hi there" is more common in the English language than the phrase "hit here", the language model may assign a higher language model score to the word combination "hi there" than the language model score that the model assigns to the word combination "hit here". Character recognition module 122 may assign then a higher total score (i.e., a first score) to the word combination "hi there" than the total score (i.e., a second score) that character recognition module 122 assigns to the word combination "hit here". In other words, based on the information stored in the lexicon, and the language model, character recognition module 122 may determine that the first character sequence "hi there" (which does not include a space character between the letters h-i-t that were received between the initial times t0 and t5 and the letters h-e-r-e that were received between the subsequent times t6 and t13) is more likely representative of the handwritten text input received between times t0 and 13 than the second character sequence "hit here" (which does include a space character between the letters h-i-t that were received between the initial times t0 and t5 and the letters h-e-r-e that were received between the subsequent times t6 and t13).

To improve the accuracy of the text recognition techniques performed by character recognition module 122, as well as to better perform word segmentation, character recognition module 122 also uses temporal characteristics of text input detected at presence-sensitive display 112 to determine the one or more individual words in a lexicon that more likely represent the text input. In particular, character recognition module 122 uses the temporal characteristics of text input to determine whether user 118 intends to enter a word break or a "space" in text input by determining whether the user 118 paused between inputting successive characters in the sequence. Character module 122 may determine that if a sufficient duration of time elapsed between receiving an initial portion of text input that is associated with the ending an initial character and a subsequent portion of the text input that is associated with the beginning of a subsequent character that the user more likely intended to designate the portion of the text input between the initial and subsequent characters as being a space or word break. Character recognition module 122 may infer that short delays in receiving text input that is associated with two successive characters is an indication of a user intent to not designate a space or word boundary in the text input and that longer delays in receiving text input that is associated with two successive characters is an indication of a user intent to enter a space or word boundary in the text input.

Character recognition module 122 may adjust, based on a duration of time between the initial time and the subsequent time, the second score (e.g., the total score associated with "hit here") to determine a third score associated with the second character sequence. For example, even though the language model of character recognition module 122 may determine that the phrase "hi there" is more common in the English language and therefore has a higher language model score than the phrase "hit here", character recognition module 122 may increase the total score of the character sequence "hit here" due to the pause identified between times t4 and t5, that is, after user 118 drew the letter t and before user 118 drew the letter h. By adjusting the total score of the character sequence "hit here" in response to the pause, character recognition module 122 may assign a higher score to the word combination "hit here" than the score that character recognition module 122 assigns to the word combination "hi there". In this way, character recognition module 122 may enable computing device 100 to receive an indication of a space or word break in a text input by identifying pauses in the text input.

Responsive to determining that the third score (e.g., the adjusted score associated with "hit here") exceeds the first score (e.g., the score associated with "hi there"), computing device 100 may output, for display, an indication of the second word sequence. In other words, after character recognition module 122 adjusts the score of the character sequence "hit here" based on temporal characteristics of the text input, character recognition module 122 may determine whether the adjusted score of the character sequence "hit here" exceeds the scores of the other potential character sequences output from the language model. In the example of FIG. 1, character recognition module 122 may determine that the adjusted score of "hit here" exceeds the score of "hi there" and output the character sequence "hit here" to text-entry module 120 for presentation at presence-sensitive display 112.

Text-entry module 120 may receive data from character recognition module 122 indicative of the character sequence "hit here". Text-entry module 120 may use the data from character recognition module 122 to produce an updated graphical user interface with the characters h-i-t- -h-r-r-re and send instructions to presence-sensitive display 112 for displaying the updated user interface (e.g., screen shot 114B).

In this way, a computing device in accordance with the described techniques may better identify word breaks or space predictions in text input than other systems. By using temporal characteristics of text input to bolster a language model and/or a spatial model output and other components of a text input system, the computing device may improve the intuitiveness of text entry by allowing users to more easily observe whether the computing device correctly interpreted the input. By more accurately predicting word breaks and space entries, the computing device may receive fewer inputs from a user having to correct incorrect word breaks or space predictions. By receiving fewer inputs, the computing device may process fewer instructions and use less electrical energy. Consequently, the computing device may receive text input faster and consume less battery power than other systems.

Figure 2:
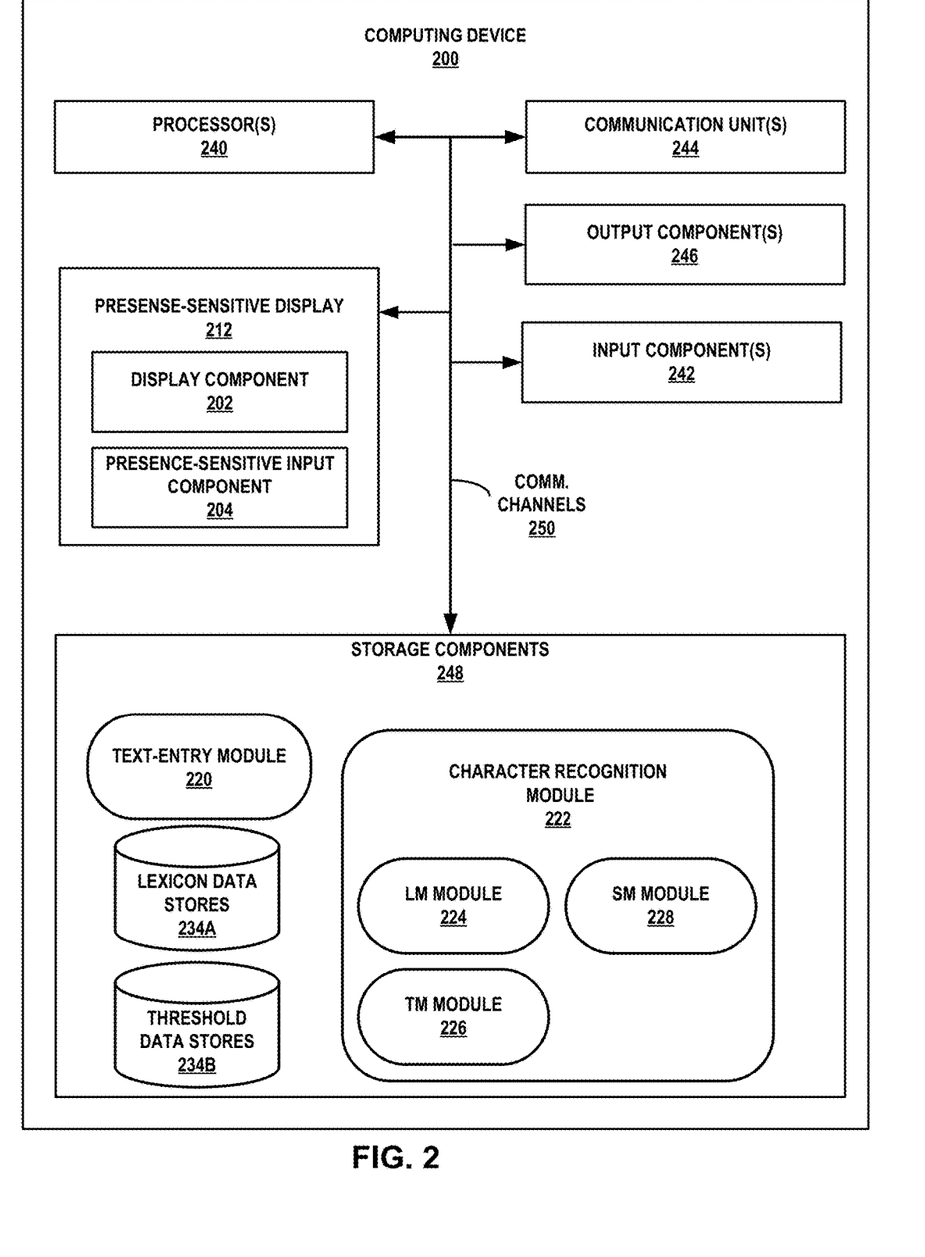
FIG. 2 is a block diagram illustrating an example computing device that is configured to segment text input into two or more words, in accordance with one or more aspects of the present disclosure.

FIG. 2 is a block diagram illustrating computing device 200 as an example computing device that is configured to segment text input into two or more words, in accordance with one or more aspects of the present disclosure. Computing device 200 of FIG. 2 is described below within the context of computing device 100 of FIG. 1. Computing device 200 of FIG. 2 in some examples represents an example of computing device 100 of FIG. 1. FIG. 2 illustrates only one particular example of computing device 200, and many other examples of computing device 200 may be used in other instances and may include a subset of the components included in example computing device 200 or may include additional components not shown in FIG. 2.

As shown in the example of FIG. 2, computing device 200 includes presence-sensitive display 212, one or more processors 240, one or more input components 242, one or more communication units 244, one or more output components 246, and one or more storage components 248. Presence-sensitive display 212 includes display component 202 and presence-sensitive input component 204.

One or more storage components 248 of computing device 200 are configured to store text-entry module 220 and character recognition module 222 which also includes temporal model (TM) module 226, language model (LM) module 224, and spatial model (SM) module 228. Additionally, storage components 248 are configured to store lexicon data stores 234A and threshold data stores 234B. Collectively, data stores 234A and 234B may be referred to herein as "data stores 234".

Communication channels 250 may interconnect each of the components 202, 204, 212, 220, 222, 224, 226, 228, 234, 240, 242, 244, 246, and 248 for inter-component communications (physically, communicatively, and/or operatively). In some examples, communication channels 250 may include a system bus, a network connection, an inter-process communication data structure, or any other method for communicating data.

One or more input components 242 of computing device 200 may receive input. Examples of input are tactile, audio, image and video input. Input components 242 of computing device 200, in one example, includes a presence-sensitive display, touch-sensitive screen, mouse, keyboard, voice responsive system, a microphone or any other type of device for detecting input from a human or machine. In some examples, input components 242 include one or more sensor components such as one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, a still camera, a video camera, a body camera, eyewear, or other camera device that is operatively coupled to computing device 200, infrared proximity sensor, hygrometer, and the like).

One or more output components 246 of computing device 200 may generate output. Examples of output are tactile, audio, still image and video output. Output components 246 of computing device 200, in one example, includes a presence-sensitive display, sound card, video graphics adapter card, speaker, cathode ray tube (CRT) monitor, liquid crystal display (LCD), or any other type of device for generating output to a human or machine.

One or more communication units 244 of computing device 200 may communicate with external devices via one or more wired and/or wireless networks by transmitting and/or receiving network signals on the one or more networks. For example, communication units 244 may be configured to communicate over a network with a remote computing system that processes text input and performs word segmentation of text input using temporal and language model characteristics as described herein. Modules 220 and/or 222 may receive, via communication units 244, from the remote computing system, an indication of a character sequence in response to outputting, via communication unit 244, for transmission to the remote computing system, an indication of a sequence of touch events. Examples of communication unit 244 include a network interface card (e.g. such as an Ethernet card), an optical transceiver, a radio frequency transceiver, a GPS receiver, or any other type of device that can send and/or receive information. Other examples of communication units 244 may include short wave radios, cellular data radios, wireless network radios, as well as universal serial bus (USB) controllers.

Presence-sensitive display 212 of computing device 200 includes display component 202 and presence-sensitive input component 204. Display component 202 may be a screen at which information is displayed by presence-sensitive display 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, presence-sensitive display 212 may present a user interface (such as a graphical user interface for receiving text input and outputting a character sequence inferred from the text input as shown in screen shots 114A and 114B in FIG. 1).

While illustrated as an internal component of computing device 200, presence-sensitive display 212 may also represent and an external component that shares a data path with computing device 200 for transmitting and/or receiving input and output. For instance, in one example, presence-sensitive display 212 represents a built-in component of computing device 200 located within and physically connected to the external packaging of computing device 200 (e.g., a screen on a mobile phone). In another example, presence-sensitive display 212 represents an external component of computing device 200 located outside and physically separated from the packaging or housing of computing device 200 (e.g., a monitor, a projector, etc. that shares a wired and/or wireless data path with computing device 200).

Presence-sensitive display 212 of computing device 200 may receive tactile input from a user of computing device 200. Presence-sensitive display 212 may receive indications of the tactile input by detecting one or more tap or non-tap gestures from a user of computing device 200 (e.g., the user touching or pointing to one or more locations of presence-sensitive display 212 with a finger or a stylus pen). Presence-sensitive display 212 may present output to a user. Presence-sensitive display 212 may present the output as a graphical user interface (e.g., as screen shots 114A and 114B from FIG. 1), which may be associated with functionality provided by various functionality of computing device 200. For example, presence-sensitive display 212 may present various user interfaces of components of a computing platform, operating system, applications, or services executing at or accessible by computing device 200 (e.g., an electronic message application, a navigation application, an Internet browser application, a mobile operating system, etc.). A user may interact with a respective user interface to cause computing device 200 to perform operations relating to one or more the various functions. For example, text-entry module 220 may cause presence-sensitive display 212 to present a graphical user interface associated with a text input function of computing device 200. The user of computing device 200 may view output presented as feedback associated with the text input function and provide input to presence-sensitive display 212 to compose additional text using the text input function.

Presence-sensitive display 212 of computing device 200 may detect two-dimensional and/or three-dimensional gestures as input from a user of computing device 200. For instance, a sensor of presence-sensitive display 212 may detect a user's movement (e.g., moving a hand, an arm, a pen, a stylus, etc.) within a threshold distance of the sensor of presence-sensitive display 212. Presence-sensitive display 212 may determine a two or three dimensional vector representation of the movement and correlate the vector representation to a gesture input (e.g., a hand-wave, a pinch, a clap, a pen stroke, etc.) that has multiple dimensions. In other words, presence-sensitive display 212 can detect a multi-dimension gesture without requiring the user to gesture at or near a screen or surface at which presence-sensitive display 212 outputs information for display. Instead, presence-sensitive display 212 can detect a multi-dimensional gesture performed at or near a sensor which may or may not be located near the screen or surface at which presence-sensitive display 212 outputs information for display.

One or more processors 240 may implement functionality and/or execute instructions associated with computing device 200. Examples of processors 240 include application processors, display controllers, auxiliary processors, one or more sensor hubs, and any other hardware configure to function as a processor, a processing unit, or a processing device. Modules 220, 222, 224, 226, and 228 may be operable by processors 240 to perform various actions, operations, or functions of computing device 200. For example, processors 240 of computing device 200 may retrieve and execute instructions stored by storage components 248 that cause processors 240 to perform the operations modules 220, 222, 224, 226, and 228. The instructions, when executed by processors 240, may cause computing device 200 to store information within storage components 248.

One or more storage components 248 within computing device 200 may store information for processing during operation of computing device 200 (e.g., computing device 200 may store data accessed by modules 220, 222, 224, 226, and 228 during execution at computing device 200). In some examples, storage component 248 is a temporary memory, meaning that a primary purpose of storage component 248 is not long-term storage. Storage components 248 on computing device 220 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 224, 226, and 228, as well as data stores 234. Storage components 248 may include a memory configured to store data or other information associated with modules 220, 222, 224, 226, and 228, as well as data stores 234.

Text-entry module 220 may include all functionality of text-entry module 120 of computing device 100 of FIG. 1 and may perform similar operations as text-entry module 120 for managing a user interface that computing device 200 provides at presence-sensitive display 212 for handling textual input from a user. Text-entry module 220 may send information over communication channels 250 that cause display component 202 of presence-sensitive display 212 to present a graphical keyboard or a handwriting input feature as part of a graphical user interface (e.g., screen shot 114A) from which a user, such as user 118, can provide text input (e.g., a sequence of textual characters) by providing tap and non-tap gestures at presence-sensitive input component 204. Text-entry module 22 may cause display component 202 to present a trace or corresponding to the locations of presence-sensitive input component 204 at which text input is received (e.g., screen shot 114A) and may also cause display component 202 to display, as graphical output (e.g., screen shot 114B), the individual characters that character recognition module 222 infers from the text input.

Character recognition module 222 may include all functionality of module 122 of computing device 100 of FIG. 1 and may perform similar operations as character recognition module 122 for performing character-level and/or word-level recognition operations on a sequence of touch events that text-entry module 220 determines from text input provided at presence-sensitive display 212. Character recognition module 22 performs character-level and/or word-level recognition operations on touch events using SM module 228, LM module 224, and TM module 226.

Threshold data stores 234A may include one or more temporal thresholds, distance or spatial based thresholds, probability thresholds, or other values of comparison that character recognition module 222 uses to infer characters from text input. The thresholds stored at threshold data stores 234B may be variable thresholds (e.g., based on a function or lookup table) or fixed values. For example, threshold data store 234A may include a first temporal threshold (e.g., 400 ms) and a second temporal threshold (e.g., 1 s). Character recognition module 222 may compare duration of a pause between successive character inputs to each of the first and second thresholds. If the duration of the pause satisfies the first threshold (e.g., is greater than 400 ms), character recognition module 222 may increase a probability or score of a character sequence that includes a word break or space corresponding to the pause by a first amount. If the duration of the pause satisfies the second threshold (e.g., is greater than 1 s), character recognition module 222 may increase the probability or score of the character sequence that includes the word break or space corresponding to the pause by a second amount that exceeds the first amount. If the duration of the pause satisfies neither the first nor the second thresholds (e.g., is less than 400 ms), character recognition module 222 may decrease the probability or score of the character sequence that includes the word break or space corresponding to the pause.

In some examples, the thresholds stored at threshold data stores 234B may be variable thresholds and may dynamically change over-time. For example, based on previous inputs, character recognition module 222 may intelligently learn (e.g., using a machine learning system) characteristics of typical input from user 118, and modify the thresholds stored at threshold data stores 234B according to the learned characteristics of user 118. For example, character recognition module 222 may determine the thresholds stored at data store based on the amount of time user 118 typically takes between inputting different letters, words, and word combinations and may determine the thresholds stored at data store based on the amount of time user 118 typically takes between inputting different letters of the same word.

In some examples the amounts with which character recognition module 222 increases or decreases the probabilities or scores of character sequences may be determined as one or more functions of the duration of the pause. For example, character recognition module 222 may determine the first amount to increase the score of a character string from a first data set (e.g., based on a first function of the duration or from a first look up table of values). Character recognition module 222 may determine the second amount to increase score of the character string from a second data set (e.g., based on a second function of the duration or from a second look up table of values). As explained in greater detail with respect to FIG. 3, the first data set and the second data set may represent two disjoint data sets that are separated by at least an order of magnitude. In some examples, the order of magnitude may be a factor (e.g., 10) or an offset (e.g., a fixed amount). For instance, character recognition module 222 may increase the score by larger amounts if the duration of the pause is greater than or equal to one second as compared to the amounts of increase that character recognition module 222 applies for pauses that last less than one second long.

SM module 228 may receive a sequence of touch events as input, and output a character or sequence of characters that likely represents the sequence of touch events, along with a degree of certainty or spatial model score indicative of how likely or with what accuracy the sequence of characters define the touch events. In other words, SM module 228 may perform handwriting recognition techniques to infer touch events as strokes, and strokes as characters and/or infer touch events as selections or gestures at keys of a keyboard and selections or gestures of keys as characters of a word. Character recognition module 122 may use the spatial model score that is output from SM module 228 in determining a total score for a potential word or words that module 122 outputs in response to text input.

LM module 224 may receive a sequence of characters as input, and output one or more candidate words or word pairs as character sequences that LM module 224 identifies from lexicon data stores 234A as being potential replacements for the sequence of characters in a language context (e.g., a sentence in a written language). For example, language model 24 may assign a language model probability to one or more candidate words or pairs of words located at lexicon data store 234A that include at least some of the same characters as the inputted sequence of characters. The language model probability assigned to each of the one or more candidate words or word pairs indicates a degree of certainty or a degree of likelihood that the candidate word or word pair is typically found positioned subsequent to, prior to, and/or within, a sequence of words (e.g., a sentence) generated from text input detected by presence-sensitive input component 204 prior to and/or subsequent to receiving the current sequence of characters being analyzed by LM module 224.

Lexicon data stores 234A may include one or more sorted databases (e.g., hash tables, linked lists, sorted arrays, graphs, etc.) that represent dictionaries for one or more written languages. Each dictionary may include a list of words and word combinations within a written language vocabulary (e.g., including grammars, slang, and colloquial word use). LM module 224 of character recognition module 222 may perform a lookup in lexicon data stores 234A for a sequence of characters by comparing the portions of the sequence to each of the words in lexicon data stores 234A. LM module 224 may assign a similarity coefficient (e.g., a Jaccard similarity coefficient) to each word in lexicon data stores 234A based on the comparison and determine one or more candidate words from lexicon data store 234A with a greatest similarity coefficient. In other words, the one or more candidate words with the greatest similarity coefficient may at first represent the potential words in lexicon data stores 234A that have spellings that most closely correlate to the spelling of the sequence of characters. LM module 224 may determine one or more candidate words that include parts or all of the characters of the sequence of characters and determine that the one or more candidate words with the highest similarity coefficients represent potential corrected spellings of the sequence of characters. In some examples, the candidate word with the highest similarity coefficient matches a sequence of characters generated from a sequence of touch events. For example, the candidate words for the sequence of characters h-i-t-h-e-r-e may include "hi", "hit", "here", "hi there", and "hit here".

LM module 224 may be an n-gram language model. An n-gram language model may provide a probability distribution for an item xi (letter or word) in a contiguous sequence of items based on the previous items in the sequence (i.e., $P(x_i|x_{i-(n-1)}, \ldots, x_{i-1})$) or a probability distribution for the item xi in a contiguous sequence of items based on the subsequent items in the sequence (i.e., $P(x_i|x_{i+1}, \ldots, x_{i+(n-1)})$). Similarly, an n-gram language model may provide a probability distribution for an item xi in a contiguous sequence of items based on the previous items in the sequence and the subsequent items in the sequence (i.e., $P(x_i|x_{i-(n-1)}, \ldots, x_{i+(n-1)})$). For instance, a bigram language model (an n-gram model where n=2), may provide a first probability that the word "there" follows the word "hi" in a sequence (i.e., a sentence) and a different probability that the word "here" follows the word "hit" in a different sentence. A trigram language model (an n-gram model where n=3) may provide a probability that the word "here" succeeds the two words "hey over" in a sequence.

In response to receiving a sequence of characters, language model 24 may output the one or more words and word pairs from lexicon data stores 234A that have the highest similarity coefficients to the sequence and the highest language model scores. Character recognition module 222 may perform further operations to determine which of the highest ranking words or word pairs to output to text-entry module 220 as a character sequence that best represents a sequence of touch events received from text-entry module 220. Character recognition module 222 may combine the language model scores output from LM module 224 with the spatial model score output from SM module 228 to derive a total score indicating that the sequence of touch events defined by text input represents each of the highest ranking words or word pairs in lexicon data stores 234A.

To improve word segmentation capabilities of character recognition module 222, and to detect word breaks or spaces in text input, TM module 226 may further analyze the touch events received from text-entry module 220 on behalf of character recognition module 222 and adjust, if necessary, the total respective scores associated with the candidate word or words being output from LM module 224. TM module 26 may determine a beginning and ending time component associated with each of the characters in the sequence of characters that character recognition module 222 infers from the sequence of touch events received from text-entry module 222. Based on the beginning and ending time component associated with each of the characters in the sequence of characters, TM module 26 may determine durations of time that elapse after user 118 completes a character until before user 118 begins a subsequent character. TM module 226 may determine that longer durations of time between successive characters indicate intended word breaks or spaces in the text input whereas shorter durations of time indicate an intended lack of word breaks or spaces in the text input.

TM module 226 may boost the total scores of word combinations that have spaces or word breaks at positions that correspond with the long pauses in the text input. In some examples, TM module 226 may boost the scores of word combinations that have a lack of spaces or lack of word breaks at positions that correspond with the shorter pauses in the text input.

In addition to spatial, temporal, and language model features, character recognition module 222 may also rely on other characteristics of the text input to infer the intended characters of the text input. For example, character recognition module 222 may rely on other spatial or distance characteristics of the text input to determine a sequence of characters that more likely represent the text input. Character recognition module 222 may infer that when a greater amount of distance separates the locations of presence-sensitive input component 204 at which presence-sensitive input component 204 detects two successive characters associated with a text input, that user 118 may wish to insert a word break or a space between the two successive characters in the text input.

For example, character recognition module 222 may increase, based on a distance between two successive portions of text input, a score of a character sequence that includes a space or word break in response to determining that the distance between the characters that bound the space or word break satisfies a distance threshold. Conversely, character recognition module 222 may decrease, based on the distance between two successive portions of text input, the score of a character sequence that includes a space or word break in response to determining that the distance between the characters that bound the space or word break does not satisfy the distance threshold.

In this way, a computing device that operates in accordance with the described techniques may make a prediction of where to insert spaces into text input dependent on temporal information, a language model, and spatial information associated with the text input. Any other combination of the temporal, language, and spatial information may also be used, including machine learned functions of measurements of the two parts of the input (before and after the potential space).

In some examples, the computing device may use a weighted combination of the temporal and the language model and the spatial distance and in some examples, the computing device may use a time-based boost. Said differently, if the computing device determines that the user waited longer than a certain amount of time between writing two successive characters or groups of characters, that it is much more likely that a word was ended before the pause. The computing device may compare the duration of a pause to a fixed threshold and add a relatively large bonus to the language model score of a character sequence that includes a space at that point.

In some examples, the computing device may tune the weighting of the temporal, language model, and special signals automatically using Minimum Error Rate Training (MERT). Using MERT, a computing device may automatically adjust parameters to minimize an error rate on a set of tuning samples. As such, the computing device, may collect training samples of users writing multiple words on the specific device (e.g., phone, watch, tablet, or the like) that needs to be tuned. In other examples, the computing device may collect training samples from an external data set (e.g., during training of an entire system or service relied on by, and separate from, the computing device).

In some examples, when the boost related time threshold of a pause has elapsed, the computing device may remove previously written strokes or ink that was output previously for display. As such, the computing device may provide further indication that the character recognition from the text input is finalized (e.g. in the context of a scrolling handwriting pane, the previously written strokes could move out of view and thus it would immediately be clear to the user that writing something new will start a new word).

In some examples, the computing device may perform similar character recognition techniques with swipe or continuous gesture keyboards. That is, in gesture typing, the computing device may infer the end of a word when the user stops a gesture. In some examples however, the computing device may ignore the stop or end of word if for example, the break between two gestures is very short. A particular advantage of this technique may before using a gesture keyboard to provide a continuous gesture for some languages that allow for long compound words (e.g., German).

In other words, in gesture typing, some computing systems may insert a space after a gesture has finished. For languages like German, where words are compounded, inserting a space after the end of every gesture may sometimes lead to too many spaces in the text input. A computing device in accordance with the described techniques may refrain from inserting a space between two consecutive gesture inputs if the time between the two gestures was very short. In some examples, for languages where spaces are rare, the computing device may by default, refrain from inserting a space after a gesture, and only insert a space if a sufficiently long pause occurs between consecutive gestures.

Figure 3:
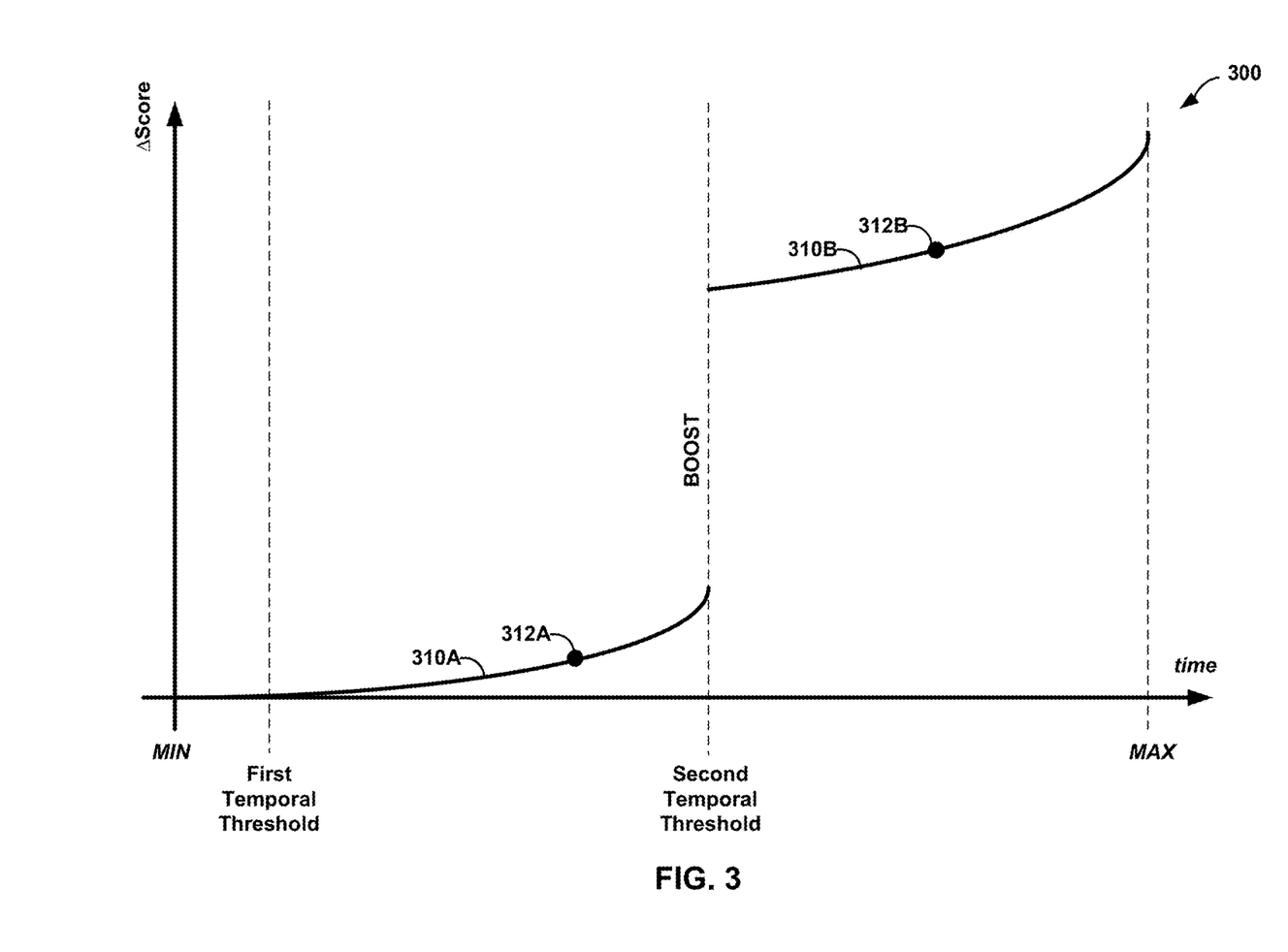
FIG. 3 is a conceptual diagram illustrating an example distribution of total score increases that vary based on time durations between portions of text input, in accordance with one or more techniques of this disclosure.

FIG. 3 is a conceptual diagram illustrating graph 300 as an example distribution of total score increases that vary based on time durations between portions of text input, in accordance with one or more techniques of this disclosure.

For purposes of illustration, FIG. 3 is described below within the context of computing device 100 of FIG. 1.

Graph 300 is made up of data set 310A and data set 310B. Both data sets 310A and 310B represent total score increases as functions of time, where the time corresponds to the duration of pauses between consecutive characters of text input. Data sets 310A and 310B are two disjoint data sets that are separated by at least an order of magnitude (represented by "boost"). In some examples, the order of magnitude may be a factor (e.g., 10) or an offset (e.g., a fixed amount). In some examples, the order of magnitude may cause the increases defined by data set 310B to be sufficiently high that the resulting total score of a candidate character string is at least approximately equivalent to 100%.

Character recognition module 122 may rely on the functions that represent data sets 310A and 310B to compute an amount of increase in a total score of a character sequence with a space or word break that corresponds to a pause in text input. For example, character recognition module 122 may identify a pause in a sequence of touch events associated with the text input received by computing device 100 between times t5 and t6.

Responsive to determining that the duration of time between times t5 and t6 satisfies a first level threshold, character recognition module 122 may increase, based on the duration of time between times t5 and t6, the total score of character sequence "hit here" by a first amount corresponding to the amount at point 312A in graph 300. Responsive to determining that the duration of time between times t5 and t6 satisfies a second level threshold, character recognition module 122 may increase, based on the duration of time between times t5 and t6, the total score of character sequence "hit here" by a second amount corresponding to the amount at point 312B in graph 300.

As shown in FIG. 3, the first amount at point 312A is from a first data set corresponding to data set 310A and the second amount at point 312B is from a second data set corresponding to data set 310B. Data sets 310A and 310B are two disjoint data sets that are separated by at least an order of magnitude (represented by "boost"). In this way, character recognition module 122 may cause a character sequence derived from text input that has a pause between consecutive characters to more likely include a space between the consecutive characters if the duration of time associated with the pause satisfies a first temporal threshold (e.g., 400 ms). Additionally, character recognition module 122 may cause a character sequence derived from text input that has a pause between consecutive characters to most certainly include a space between the consecutive characters if the duration of time associated with the pause satisfies a second temporal threshold (e.g., 1 s).

Figure 4:
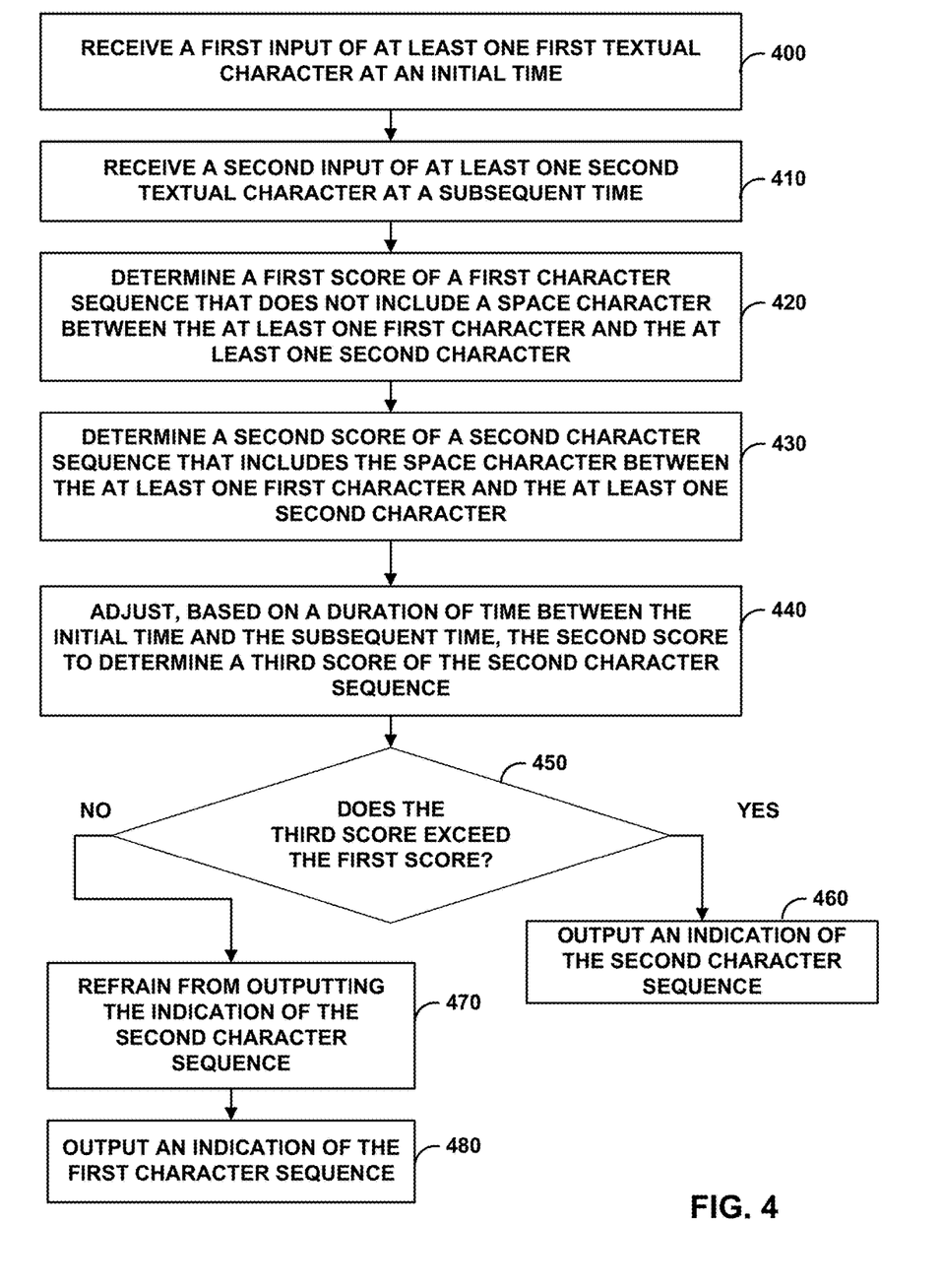
FIG. 4 is a flowchart illustrating example operations of an example computing device that is configured to segment text input into two or more words, in accordance with one or more aspects of the present disclosure.

FIG. 4 is a flowchart illustrating example operations performed by an example computing device that is configured to segment text input into two or more words, in accordance with one or more aspects of the present disclosure. The process of FIG. 4 may be performed by one or more processors of a computing device, such as computing device 100 of FIG. 1 and/or computing device 200 of FIG. 2. The steps of the process of FIG. 4 may in some examples, be repeated, omitted, and/or performed in any order. For purposes of illustration, FIG. 4 is described below within the context of computing device 100 of FIG. 1.

In the example of FIG. 4, computing device 100 may receive (400) a first input of at least one first textual character at an initial time and computing device 100 may receive (410) a second input of at least one second textual character at a subsequent time. For example, presence-sensitive display 112 may detect user 118 providing initial text input as user 118 gestures at or near presence-sensitive display 112 between times t0 and t5 to draw or write the letters h-i-t. Presence-sensitive display 112 may detect user 118 providing subsequent text input as user 118 gestures at or near presence-sensitive display 112 between times t6 and t13 to draw or write the letters h-e-r-e.

Computing device 100 may determine (420) a first score of a first character sequence that does not include a space character between the at least one first character and the at least one second character. Computing device may determine (430) a second score of a second character sequence that includes the space character between the at least one first character and the at least one second character. For example, text-entry module 120 may process the initial text input and the subsequent text input into a sequence of touch events that define the time and locations at which presence-sensitive display 112 detected user 118 drawing the letters h-i-t-h-e-r-e. A spatial model of character recognition module 122 may generate a sequence of characters based on the sequence of touch events along with a score associated with the touch events, and input the sequence of characters into a language model. The language model of character recognition module 122 may output two candidate character strings "hi there" and "hit here" as potential candidate character strings that user 118 intended to enter. Character recognition module 122 may assign a first score to the candidate character string "hi there" and may assign a second score to the candidate character string "hit here". The first score may be based on at least one of a first language model score or a first spatial model score associated with the first character sequence and the second score is based on at least one of a second language model score or a second spatial model score associated with the first character sequence.

Computing device 100 may adjust (440), based on a duration of time between the initial time and the subsequent time, the second score to determine a third score of the second character string. For example, character recognition module 122 may compare the amount of time between time t5 (the moment when user 118 finished inputting the initial text input associated with the letters h-i-t) and time t6 (the moment when user 118 began inputting the subsequent text input associated with the letters h-e-r-e) to one or more temporal thresholds that are indicative of an intentional word break or space in text input. Character recognition module 122 may increase the second score to determine a third score of the candidate character string "hit here" if the pause between times t5 and t6 satisfies the one or more temporal thresholds that are indicative of an intentional word break or space in text input.

Computing device 100 may determine (450) whether the third score exceeds the first score. For example, after adjusting the scores based on temporal characteristics of the text input, character recognition module 122 may output, to text-entry module 120, the candidate character string with the highest or greatest score.

If after adjusting for pauses, the third score exceeds the first score, computing device 100 may output (460) an indication of the second character sequence. For example, character recognition module 122 may output the character string "hit here" to text-entry module 120 so that text-entry module 120 can cause presence-sensitive display 112 to display the phrase "hit here" (e.g., as screen shot 114B).

If however, after adjusting for pauses, the third score does not exceed the first score, computing device 100 may refrain (470) from outputting the indication of the second character sequence and instead output (480) an indication of the first character sequence. For example, character recognition module 122 may output the character string "hi there" to text-entry module 120 so that text-entry module 120 can cause presence-sensitive display 112 to display, despite the pause between times t5 and t6, the more common phrase "hi there".

Clause 1. A method comprising: after receiving, at an initial time, a first input of at least one first textual character, receiving, by a computing device, at a subsequent time, a second input of at least one second textual character; determining, by the computing device, based on the at least one first textual character and the at least on second textual character, a first character sequence and a second character sequence, wherein the second character sequence includes a space character between the at least one first textual character and the at least one second textual character and the first character sequence does not include the space character between the at least one first textual character and the at least one second textual character; determining, by the computing device, a first score associated with the first character sequence and a second score associated with the second character sequence, wherein the first score is based on at least one of a first language model score or a first spatial model score associated with the first character sequence and the second score is based on at least one of a second language model score or a second spatial model score associated with the first character sequence; adjusting, by the computing device, based on a duration of time between the initial time and the subsequent time, the second score to determine a third score associated with the second character sequence; and responsive to determining that the third score exceeds the first score, outputting, by the computing device, for display, an indication of the second character sequence.

Clause 2. The method of clause 1, wherein adjusting the second score comprises: increasing, by the computing device, based on the duration, the second score to determine the third score.

Clause 3. The method of any of clause 2, wherein increasing the second score comprises: increasing, by the computing device, based on the duration, the second score by a first amount in response to determining that the duration of time satisfies a first level threshold; and increasing, by the computing device, based on the duration, the second score by a second amount in response to determining that the duration of time satisfies a second level threshold.

Clause 4. The method of clause 3, wherein increasing the second score further comprises: determining, by the computing device, the first amount from a first data set; and determining, by the computing device, the second amount from a second data set, wherein the first data set and the second data set are two disjoint data sets that are separated by at least an order of magnitude.

Clause 5. The method of any of clauses 1-4, wherein: receiving the first input comprises detecting, by the computing device, a first selection of one or more keys of a keyboard; and receiving the second input comprises detecting, by the computing device, a second selection of the one or more keys of the keyboard.

Clause 6. The method of clause 5, wherein the keyboard is a graphical keyboard or a physical keyboard.

Clause 7. The method of any of clauses 1-7, wherein: receiving the first input comprises detecting, by the computing device, at a presence-sensitive input device, first handwritten input; and receiving the second input comprises detecting, by the computing device, at the presence-sensitive input device, second handwritten input.

Clause 8. The method of clause 7, further comprising: determining, by the computing device, based on the first handwritten input, a first location of the presence-sensitive input device at which the first input of the at least one first textual character is received; determining, by the computing device, based on the second handwritten input, a second location of the presence-sensitive input device at which the second input of the at least one second textual character is received; and adjusting, by the computing device, based on a distance between the first location and the second location, the score to determine the third score.

Clause 9. The method of clause 8, wherein adjusting the second score comprises: increasing, by the computing device, based on the distance, the second score in response to determining that the distance satisfies a distance threshold; and decreasing, by the computing device, based on the distance, the second score in response to determining that the distance does not satisfy the distance threshold.

Clause 10. The method of any of clauses 1-10, further comprising: responsive to determining that the first score exceeds the third score: refraining from outputting the indication of the second character sequence; and outputting, by the computing device, for display, an indication of the first character sequence.

Clause 11. A computing device comprising: a presence-sensitive display; at least one processor; and at least one module operable by the at least one processor to: after receiving, at an initial time, a first input detected by the presence-sensitive display of at least one first textual character, receive, at a subsequent time, a second input detected by the presence-sensitive display of at least one second textual character; determine, based on the at least one first textual character and the at least on second textual character, a first character sequence and a second character sequence, wherein the second character sequence includes a space character between the at least one first textual character and the at least one second textual character and the first character sequence does not include the space character between the at least one first textual character and the at least one second textual character; determine a first score associated with the first character sequence and a second score associated with the second character sequence, wherein the first score is based on at least one of a first language model score or a first spatial model score associated with the first character sequence and the second score is based on at least one of a second language model score or a second spatial model score associated with the first character sequence; adjust, based on a duration of time between the initial time and the subsequent time, the second score to determine a third score associated with the second character sequence; and responsive to determining that the third score exceeds the first score, output, for display at the presence-sensitive display, an indication of the second character sequence.

Clause 12. The computing device of clause 11, wherein the at least one module is further operable by the at least one processor to adjust the second score by at least increasing, based on the duration, the second score to determine the third score.

Clause 13. The computing device of clause 12, wherein the at least one module is further operable by the at least one processor to increase the second score by at least: increasing, based on the duration, the second score by a first amount in response to determining that the duration of time satisfies a first level threshold; and increasing, based on the duration, the second score by a second amount in response to determining that the duration of time satisfies a second level threshold.

Clause 14. The computing device of clause 13, wherein the at least one module is further operable by the at least one processor to increase the score by at least: determining the first amount from a first data set; and determining the second amount from a second data set, wherein the first data set and the second data set are two disjoint data sets that are separated by at least an order of magnitude.

Clause 15. The computing device of any of clauses 11-14, wherein the at least one module is further operable by the at least one processor to: receive the first input by at least detecting, at the presence-sensitive display, first handwritten input; and receive the second input by at least detecting, at the presence-sensitive display, second handwritten input.

Clause 16. A computer-readable storage medium comprising instructions that, when executed by at least one processor of a computing device, cause the at least one processor to: after receiving, at an initial time, a first input of at least one first textual character, receive, at a subsequent time, a second input of at least one second textual character; determine, based on the at least one first textual character and the at least on second textual character, a first character sequence and a second character sequence, wherein the second character sequence includes a space character between the at least one first textual character and the at least one second textual character and the first character sequence does not include the space character between the at least one first textual character and the at least one second textual character; determine a first score associated with the first character sequence and a second score associated with the second character sequence, wherein the first score is based on at least one of a first language model score or a first spatial model score associated with the first character sequence and the second score is based on at least one of a second language model score or a second spatial model score associated with the first character sequence; adjust, based on a duration of time between the initial time and the subsequent time, the second score to determine a third score associated with the second character sequence; and responsive to determining that the third score exceeds the first language model score, output, for display, an indication of the second character sequence.

Clause 17. The computer-readable storage medium of clause 16 comprising additional instructions that, when executed by the at least one processor of the computing device, cause the at least one processor to adjust the second score by at least increasing, based on the duration, the second score to determine the third score.

Clause 18. The computer-readable storage medium of clause 17 comprising additional instructions that, when executed by the at least one processor of the computing device, cause the at least one processor to increase the second score by at least: increasing, based on the duration, the second score by a first amount in response to determining that the duration of time satisfies a first level threshold; and increasing, based on the duration, the second score by a second amount in response to determining that the duration of time satisfies a second level threshold.

Clause 19. The computer-readable storage medium of clause 18 comprising additional instructions that, when executed by the at least one processor of the computing device, cause the at least one processor to increase the second score by at least: determining the first amount from a first data set; and determining the second amount from a second data set, wherein the first data set and the second data set are two disjoint data sets that are separated by at least an order of magnitude.

Clause 20. The computer-readable storage medium of any of clauses 16-19 comprising additional instructions that, when executed by the at least one processor of the computing device, cause the at least one processor to: receive the first input by at least detecting, at a presence-sensitive input device, first handwritten input; and receive the second input by at least detecting, at the presence-sensitive input device, second handwritten input.

Clause 21. A system comprising means for performing any of the methods of clauses 1-10.

Clause 22. A computing device comprising means for performing any of the methods of clauses 1-10.

Clause 23. The computing device of clause 11 further comprising means for performing any of the methods of clauses 1-10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperable hardware units, including one or more processors as described above, in conjunction with suitable software and/or firmware.

Various examples have been described. These and other examples are within the scope of the following claims.

What is claimed is:

1. A method comprising:
    after receiving, at an initial time, a first input of at least one first textual character, receiving, by a computing device, at a subsequent time, a second input of at least one second textual character;
    determining, by the computing device, based on the at least one first textual character and the at least one second textual character, a first character sequence and a second character sequence, wherein the second character sequence includes a space character between the at least one first textual character and the at least one second textual character and the first character sequence does not include the space character between the at least one first textual character and the at least one second textual character;
    determining, by the computing device, a first score associated with the first character sequence and a second score associated with the second character sequence, wherein the first score is based on at least one of a first language model score or a first spatial model score associated with the first character sequence and the second score is based on at least one of a second language model score or a second spatial model score associated with the first character sequence;
    adjusting, by the computing device, based on a duration of time between the initial time and the subsequent time, the second score to determine a third score associated with the second character sequence; and
    responsive to determining that the third score exceeds the first score, outputting, by the computing device, for display, an indication of the second character sequence.

2. The method of claim 1, wherein adjusting the second score comprises:
    increasing, by the computing device, based on the duration, the second score to determine the third score.

3. The method of claim 2, wherein increasing the second score comprises:
    increasing, by the computing device, based on the duration, the second score by a first amount in response to determining that the duration of time satisfies a first level threshold; and increasing, by the computing device, based on the duration, the second score by a second amount in response to determining that the duration of time satisfies a second level threshold.

4. The method of claim 3, wherein increasing the second score further comprises:
determining, by the computing device, the first amount from a first data set; and
determining, by the computing device, the second amount from a second data set, wherein the first data set and the second data set are two disjoint data sets that are separated by at least an order of magnitude.

5. The method of claim 1, wherein:
receiving the first input comprises detecting, by the computing device, a first selection of one or more keys of a keyboard; and
receiving the second input comprises detecting, by the computing device, a second selection of the one or more keys of the keyboard.

6. The method of claim 5, wherein the keyboard is a graphical keyboard or a physical keyboard.

7. The method of claim 1, wherein:
receiving the first input comprises detecting, by the computing device, at a presence-sensitive input device, first handwritten input; and
receiving the second input comprises detecting, by the computing device, at the presence-sensitive input device, second handwritten input.

8. The method of claim 7, further comprising:
determining, by the computing device, based on the first handwritten input, a first location of the presence-sensitive input device at which the first input of the at least one first textual character is received;
determining, by the computing device, based on the second handwritten input, a second location of the presence-sensitive input device at which the second input of the at least one second textual character is received; and
adjusting, by the computing device, based on a distance between the first location and the second location, the second score to determine the model score.

9. The method of claim 8, wherein adjusting the second score comprises:
increasing, by the computing device, based on the distance, the second score in response to determining that the distance satisfies a distance threshold; and
decreasing, by the computing device, based on the distance, the second score in response to determining that the distance does not satisfy the distance threshold.

10. The method of claim 1, further comprising:
responsive to determining that the first score exceeds the third score:
refraining from outputting the indication of the second character sequence; and
outputting, by the computing device, for display, an indication of the first character sequence.

11. A computing device comprising:
a presence-sensitive display;
at least one processor; and
at least one module operable by the at least one processor to:
after receiving, at an initial time, a first input detected by the presence-sensitive display of at least one first textual character, receive, at a subsequent time, a second input detected by the presence-sensitive display of at least one second textual character;
determine, based on the at least one first textual character and the at least one second textual character, a first character sequence and a second character sequence, wherein the second character sequence includes a space character between the at least one first textual character and the at least one second textual character and the first character sequence does not include the space character between the at least one first textual character and the at least one second textual character;
determine a first score associated with the first character sequence and a second score associated with the second character sequence, wherein the first score is based on at least one of a first language model score or a first spatial model score associated with the first character sequence and the second score is based on at least one of a second language model score or a second spatial model score associated with the first character sequence;
adjust, based on a duration of time between the initial time and the subsequent time, the second score to determine a third score associated with the second character sequence; and
responsive to determining that the third score exceeds the first score, output, for display at the presence-sensitive display, an indication of the second character sequence.

12. The computing device of claim 11, wherein the at least one module is further operable by the at least one processor to adjust the second score by at least increasing, based on the duration, the second score to determine the third score.

13. The computing device of claim 12, wherein the at least one module is further operable by the at least one processor to increase the second score by at least:
increasing, based on the duration, the second score by a first amount in response to determining that the duration of time satisfies a first level threshold; and
increasing, based on the duration, the second score by a second amount in response to determining that the duration of time satisfies a second level threshold.

14. The computing device of claim 13, wherein the at least one module is further operable by the at least one processor to increase the second score by at least:
determining the first amount from a first data set; and
determining the second amount from a second data set, wherein the first data set and the second data set are two disjoint data sets that are separated by at least an order of magnitude.

15. The computing device of claim 11, wherein the at least one module is further operable by the at least one processor to:
receive the first input by at least detecting, at the presence-sensitive display, first handwritten input; and
receive the second input by at least detecting, at the presence-sensitive display, second handwritten input.

16. A computer-readable storage medium comprising instructions that, when executed by at least one processor of a computing device, cause the at least one processor to:
after receiving, at an initial time, a first input of at least one first textual character, receive, at a subsequent time, a second input of at least one second textual character;
determine, based on the at least one first textual character and the at least one second textual character, a first character sequence and a second character sequence, wherein the second character sequence includes a space character between the at least one first textual character and the at least one second textual character and the first character sequence does not include the space character between the at least one first textual character and the at least one second textual character;

determine a first score associated with the first character sequence and a second score associated with the second character sequence, wherein the first score is based on at least one of a first language model score or a first spatial model score associated with the first character sequence and the second score is based on at least one of a second language model score or a second spatial model score associated with the first character sequence;

adjust, based on a duration of time between the initial time and the subsequent time, the second score to determine a third score associated with the second character sequence; and responsive to determining that the third score exceeds the first score, output, for display, an indication of the second character sequence.

17. The computer-readable storage medium of claim 16 comprising additional instructions that, when executed by the at least one processor of the computing device, cause the at least one processor to adjust the second score by at least increasing, based on the duration, the second score to determine the score.

18. The computer-readable storage medium of claim 17 comprising additional instructions that, when executed by the at least one processor of the computing device, cause the at least one processor to increase the second score by at least:

increasing, based on the duration, the second score by a first amount in response to determining that the duration of time satisfies a first level threshold; and increasing, based on the duration, the second score by a second amount in response to determining that the duration of time satisfies a second level threshold.

19. The computer-readable storage medium of claim 18 comprising additional instructions that, when executed by the at least one processor of the computing device, cause the at least one processor to increase the second score by at least:

determining the first amount from a first data set; and determining the second amount from a second data set, wherein the first data set and the second data set are two disjoint data sets that are separated by at least an order of magnitude.

20. The computer-readable storage medium of claim 16 comprising additional instructions that, when executed by the at least one processor of the computing device, cause the at least one processor to:

receive the first input by at least detecting, at a presence-sensitive input device, first handwritten input; and receive the second input by at least detecting, at the presence-sensitive input device, second handwritten input.

* * * * *